United States Patent Office 3,019,228
Patented Jan. 30, 1962

3,019,228
4-DIPHENYL(METHYL/HYDROXYMETHYL) SPIROPIPERIDINES AND PROCESS
Kurt J. Rorig, Glenview, Ill., assignor to G. D. Searle & Co., Chicago, Ill., a corporation of Delaware
No Drawing. Filed Apr. 29, 1959, Ser. No. 809,624
7 Claims. (Cl. 260—293)

This invention relates to 4-diphenylmethylspiropiperidines optionally α-hydroxylated, and a process for the manufacture thereof. More particularly, this invention relates to spiropiperidines of the formula

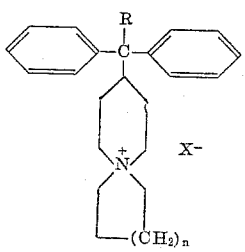

wherein R represents hydrogen or a hydroxy radical, X represents halogen, and $n$ represents either 1 or 2. Among the halogens represented by X, especially chlorine, bromine, and iodine are preferred. Those skilled in the art will appreciate that when $n$ in the formula is 1, the contemplated compounds are spiro[piperidine-1,1'-pyrrolidinium] halides, whereas when $n$ is 2, the compounds contemplated are 1,1'-spirobipiperidinium halides.

The compounds to which this invention relates are useful because of their valuable pharmacological properties. Thus, for example, they exert a depressant effect on the central nervous system and, accordingly, are anti-emetic and barbiturate-potentiating agents. Further, they manifest anti-secretory and anti-fungal activity.

Manufacture of the subject compositions proceeds by heating an appropriate diphenylmethylpiperidine

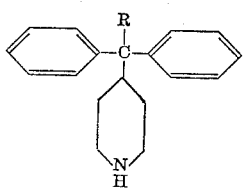

with a dihaloalkane of the formula

$$X—CH_2CH_2CH_2(CH_2)_n—X$$

(R, X, and $n$ being defined as before) in an inert solvent such as chloroform, acetone, butanone, methanol, butanol, etc. Temperatures of the order of 60–100° for periods of time ranging from 1 to 48 hours are efficacious, and an alkaline catalyst such as sodium or potassium carbonate is commonly present.

The following examples describe in detail certain of the compounds illustrative of the present invention and methods which have been devised for their manufacture. However, the invention is not to be construed as limited thereby, either in spirit or in scope, since it will be apparent to those skilled in the art that many modifications, both of materials and of methods, may be practiced without departing from the purpose and intent of this disclosure. In the examples hereinafter detailed, temperatures are given in degrees centigrade and relative amounts of materials in parts by weight, except as otherwise noted.

EXAMPLE 1

*4-diphenylhydroxymethylspiro[piperidine-1,1'-pyrrolidinium] bromide*

A mixture of 53 parts of α,α-diphenyl-4-piperidinemethanol, 47 parts of 1,4-dibromobutane, and 28 parts of finely powdered anhydrous potassium carbonate in 1250 parts of 1-butanol is heated at the boiling point under reflux with vigorous agitation for 19 hours. Insoluble solids are removed from the hot reaction mixture by filtration and exhaustively extracted with hot 1-butanol. From the resultant extracts and from the reaction mixture filtrate, on chilling, there precipitate iridescent needles of pure 4-diphenylhydroxymethylspiro[piperidine - 1,1'-pyrrolidinium] bromide which, recovered by filtration and dried in air, melts at approximately 310–311° with decomposition and gas evolution. The product has the formula

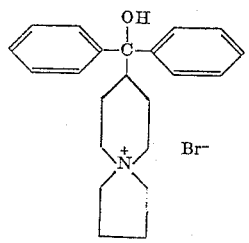

EXAMPLE 2

*4-diphenylhydroxymethyl-1,1'-spirobipiperidinium bromide*

A mixture of 53 parts of α,α-diphenyl-4-piperidinemethanol, 50 parts of 1,5-dibromopentane, and 28 parts of finely powdered anhydrous potassium carbonate in 1000 parts of 1-butanol is heated at the boiling point under reflux with vigorous agitation for 7 hours. The reaction mixture is then filtered hot; and the filtrate is chilled, precipitating therefrom 4-diphenylhydroxymethyl-1,1'-spiropiperidinium bromide melting at approximately 331° with decomposition. The decomposition point varies somewhat with the length of the heating period. The product has the formula

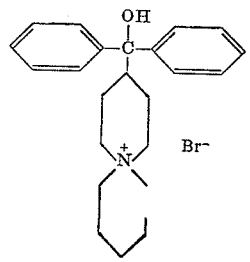

EXAMPLE 3

*4-diphenylmethylspiro[piperidine-1,1'-pyrrolidinium] bromide*

Using essentially the technique of the preceding Example 2, but substituting 50 parts of 4-(diphenylmethyl)piperidine and 47 parts of 1,4-dibromobutane for the α,α-diphenyl-4-piperidinemethanol and 1,5-dibromopentane called for therein, respectively, one obtains massive colorless needles of 4-diphenylmethylspiro[piperidine-1,1'-pyrrolidinium] bromide, melting at 279–281°. The product has the formula

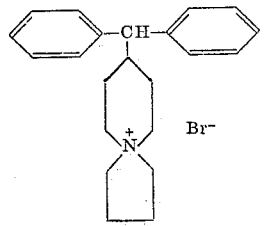

EXAMPLE 4

*4-diphenylmethyl-1,1'-spirobipiperidinium bromide*

Using essentially the technique of Example 2, but substituting 50 parts of 4-(diphenylmethyl)piperidine for the 53 parts of α,α-diphenyl-4-piperidinemethanol called for therein, one obtains 4-diphenylmethyl-1,1'-spirobipiperidinium bromide which, recrystallized from 1-butanol, melts at approximately 323–324° with gas evolution. The product has the formula

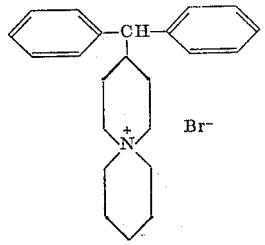

What is claimed is:
1. A compound of the formula

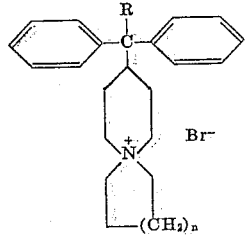

wherein R is selected from the group consisting of hydrogen and hydroxy radicals and $n$ is a positive integer amounting to less than 3.

2. A compound of the formula

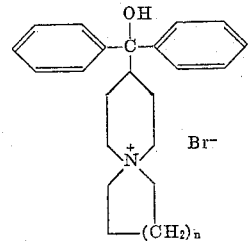

wherein $n$ is a positive integer amounting to less than 3.

3. 4 - diphenylhydroxymethylspiro[piperidine - 1,1'-pyrrolidinium] bromide.

4. 4 - diphenylhydroxymethyl - 1,1' - spirobipiperidinium bromide.

5. A compound of the formula

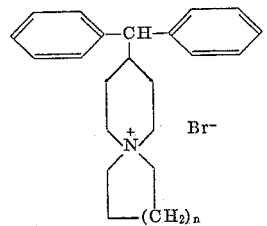

wherein $n$ is a positive integer amounting to less than 3.

6. 4-diphenylmethylspiro[piperidine - 1,1' - pyrrolidinium] bromide.

7. 4-diphenylmethyl - 1,1' - spirobiperidinium bromide.

References Cited in the file of this patent
UNITED STATES PATENTS

| | | |
|---|---|---|
| 2,486,792 | Miescher et al. | Nov. 1, 1949 |
| 2,486,793 | Miescher et al. | Nov. 1, 1949 |
| 2,486,794 | Miescher et al. | Nov. 1, 1949 |
| 2,748,143 | Erickson | May 29, 1956 |